Oct. 16, 1934.   E. O. BENJAMIN   1,976,914
STRAINER
Filed April 17, 1931
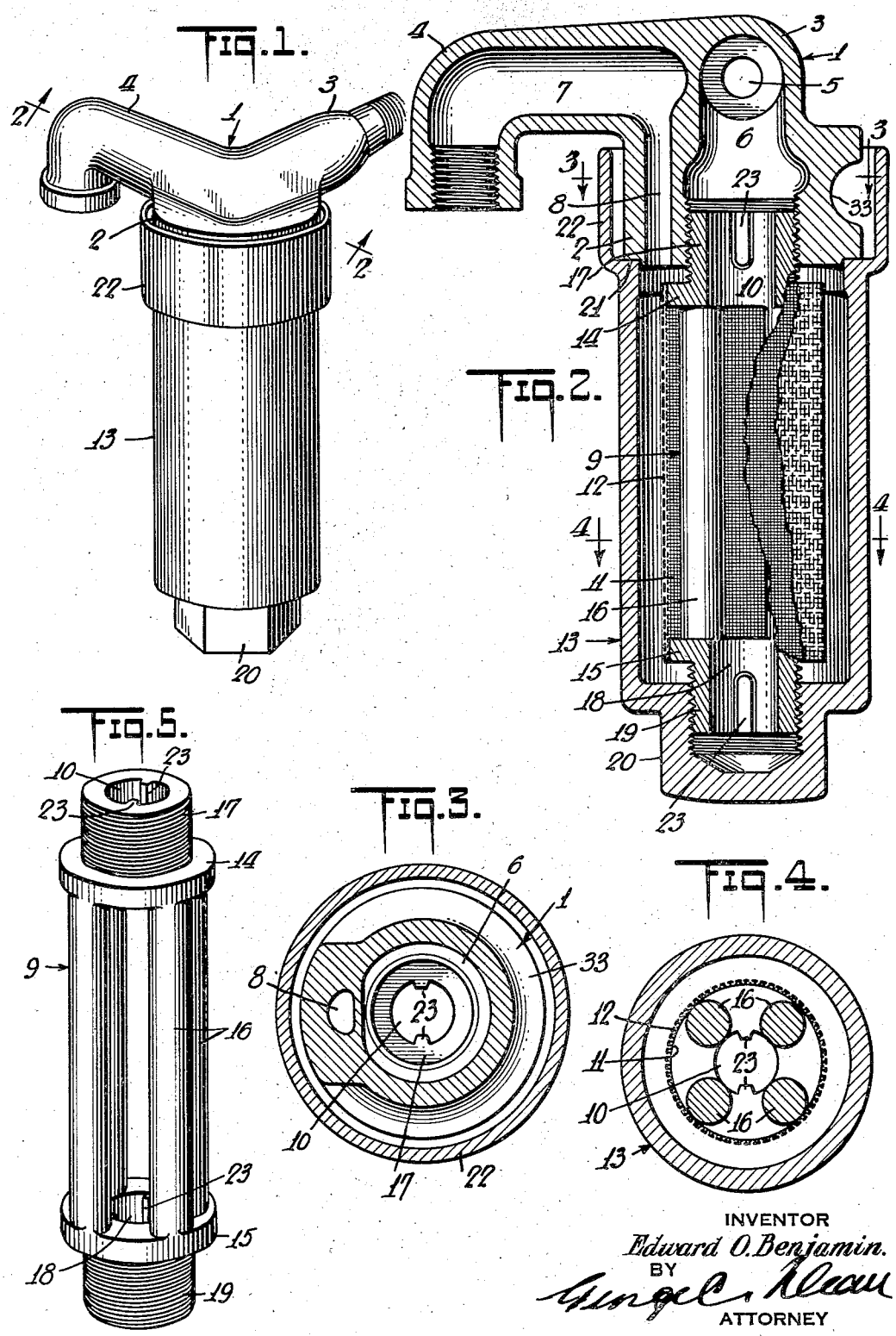
INVENTOR
Edward O. Benjamin.
BY
ATTORNEY Patented Oct. 16, 1934

1,976,914

UNITED STATES PATENT OFFICE 1,976,914

STRAINER

Edward O. Benjamin, Newark, N. J.

Application April 17, 1931, Serial No. 530,834

3 Claims. (Cl. 210—165)

My present invention relates more particularly to strainers adapted for use in oil burner systems. In a preferred form the invention is embodied in a structure including a strainer head having inlet and outlet passages connecting with the lower side of the head, one centrally and the other near the periphery of the head, a removable strainer cage connected with the lower side of the head and having a central opening communicating with the central end of a passage in the head, a strainer element surrounding said cage, and a casing or cup surrounding said cage and connected with the lower end of the cage and the lower side of the head so that all oil or liquid passing through the strainer must pass through the strainer element, the cup being provided at its upper end and with an enlarged portion normally surrounding the lower part of the head and being of such capacity as to hold all oil drained from the head when the casing is removed for some purpose such as cleaning. It will be evident that a strainer constructed along these lines is easy to assemble and to disassemble without spilling oil.

Other features and advantages will appear upon consideration of the following description and of the drawing, in which Fig. 1 is a perspective view of a strainer embodying the present invention;

Fig. 2 is a section taken along the line 2—2 of Fig. 1;

Fig. 3 is a section taken along the line 3—3 of Fig. 2;

Fig. 4 is a section taken along the line 4—4 of Fig. 2; and

Fig. 5 is a view of the strainer cage separated from the rest of the structure.

Referring to the drawing 1 indicates a strainer head having a depending central portion 2, a tubular outlet portion 3 extending transversely from the upper part of the said depending portion and a tubular inlet portion 4 extending in another direction from the upper part of the depending portion 2, the tubular outlet 3 having therein a passage 5 connected at its inner end with the upper end of a central bore 6 extending to the lower end or surface of the depending portion 2 and a tubular inlet member 4 having therein a passage 7 connected at its inner end with the lower end of the depending portion 2 by means including an eccentric passage 8 extending downwardly from the inner end of the passage 7 to the lower end of the portion 2. As indicated in Figs. 2 and 3, the passage 8 is spaced outwardly from the central passage 6.

Suspended from the depending portion 2 is a strainer cage 9 having at its upper end a passage 10 communicating with passage 6. The cage 9 is surrounded by straining material or a strainer 11, which preferably consists of monel metal cloth of 200 mesh which prevents the passage of impurities of substantial size. The fine strainer 11 is protected by a heavy outer screen 12 which may be of heavy hard brass. Around the strainer cage is a strainer cup 13 of substantially greater diameter than the heavy metal screen 12, serving to receive oil flowing downwardly through the passage 8 and to supply the oil thus received to the strainer members 11 and 12 through which it passes to the interior of the cage 9 and then upwardly through the passage 10 in the upper end of the cage to the passage 6 in the upper end of the strainer head and communicating with the passage 5 in the outlet.

Preferably the strainer cage 9 is formed with similar ends 14 and 15 connected by a plurality of longitudinal members 16, preferably cylindrical in form. The upper end 14 of the cage includes an upwardly extending cylindrical portion 17 externally threaded for screwing into the internally threaded lower end of the passage 6. The lower end 15 is also provided with a central opening 18 and a downwardly externally threaded portion 19 over which may be screwed the internally threaded lower end 20 of the strainer cup 13. The strainer cup 13 is also provided with an upwardly facing shoulder 21 which is pressed into tight engagement with the lower side of the depending portion 2 of the strainer head to effect a seal at that location. Above the shoulder 21 the strainer cup 13 is formed with a cylindrical portion 22 of greater internal diameter than the exterior of the depending portion 2 of the strainer head. For convenience in screwing the parts together and unscrewing them, the heads 14 and 15 are provided at their interiors with diametrically opposite ribs 23 for engagement by suitable implements.

In operation, sediment may collect at the lower end of the main part of the cup 13 and also beneath the lower end of the lower head 15 in the opening in the lower end 20 of the strainer cup. In the event that it is desirable to clean the strainer, a suitable implement such as a wrench may be applied to the lower end 20, preferably hexagonal in shape, of the strainer cup 13 and the cup turned so as to unscrew it from the lower end of the strainer cage from the strainer head. Thus in removing the strainer cup, the strainer head may remain either in the cup or attached to the strainer head. The strainer cage is then removed either from the cup or head by unscrewing it. In this removal, the enlarged upper part 22 of the strainer cup 13 and the recess 33 serve to receive oil that drains from within the strainer head 1, when the seal is broken by the unscrewing. Thus the strainer cup 13 may be removed without spilling oil. Then after the strainer has been cleaned, the parts may be replaced.

It should be understood that various changes in the construction and arrangement of parts may be made and that certain features may be used without others without department from the true scope and spirit of the invention.

I claim:

1. In an oil strainer, the combination of a head having a central outlet passage extending upwardly from the lower face and an ccentric inlet passage also extending upwardly, a filter cage having at its upper end an externally threaded portion to screw into the lower end of said central outlet passage and another externally threaded portion at its lower end, together with a cup to enclose and extend above the cage, said cup having in its bottom an internally threaded recess for screwing over the lower end of said cage and an enlarged upper end surrounding the head above the seal between the cup and head of but slightly larger diameter than the cup, but of capacity sufficient when the cup is removed to hold the oil drained from above the level of the strainer.

2. In an oil strainer, the combination of a head having a downwardly extending body with a central passage extending upwardly from the lower surface of said body, a passage at the side of the central passage and extending upwardly from the lower surface of said body, and an upper part having an outlet passage connected with the upper end of said central passage and an inlet passage connected with the upper end of the other passage in said body, a hollow strainer member including upper and lower screw-threaded members and a structurally rigid cage of larger diameter connecting said upper and lower screw-threaded members and a relatively flexible strainer element surrounding and supported by said cage, said strainer member being connected at its upper end with said head by its upper screw thread so that the central passage in the head connects with the interior of the strainer element, and an oil-tight strainer cup surrounding and extending above said strainer element and having above said strainer a shoulder to engage the lower side of said body and above said shoulder an enlarged portion to hold the oil drained from the head when the cup is removed from the head; said cup having its lower portion formed with a screw thread for engaging the lower screw thread of said strainer element, whereby the latter acts as a tension member for applying screw thrust of the cup shoulder against the lower side of the downwardly extending body of the head.

3. In an oil strainer, a head formed with central and eccentric oil passages of relatively small oil containing capacity, adapted to be fixed in an oil line, and a readily removable cup comprising a pendant lower cup portion constituting the strainer cavity and and carrying at its upper end an upstanding supplemental cup portion surrounding the head above the level of the seal between the cup and the head, said upper end being of slightly greater diameter than the head and affording an oil receiving annulus of volume proportioned to receive the volume of oil contained in the head conduits regardless of the volume of the strainer cavity.

EDWARD O. BENJAMIN.